US006950865B1

(12) United States Patent
Depaolantonio

(10) Patent No.: US 6,950,865 B1
(45) Date of Patent: Sep. 27, 2005

(54) NETWORK AUDIT TOOL

(75) Inventor: Joe Depaolantonio, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 09/818,049

(22) Filed: Mar. 26, 2001

(51) Int. Cl.$^7$ .......................................... G06F 15/173
(52) U.S. Cl. ...................... 709/223; 709/224; 709/225; 709/226
(58) Field of Search ................................ 709/200–253

(56) References Cited

U.S. PATENT DOCUMENTS

| | | | |
|---|---|---|---|
| 5,367,394 A | 11/1994 | Chuter et al. ............... 359/110 |
| 5,561,542 A | 10/1996 | Kosugi et al. ............... 359/118 |
| 5,663,819 A | 9/1997 | Lewis ......................... 359/118 |
| 5,968,122 A * | 10/1999 | Schlosser et al. ........... 709/223 |
| 5,995,256 A | 11/1999 | Fee ............................. 359/125 |
| 6,026,500 A * | 2/2000 | Topff et al. .................... 714/26 |
| 6,072,609 A | 6/2000 | Masuda ....................... 359/110 |
| 6,115,743 A | 9/2000 | Cowan et al. ............... 709/224 |
| 6,128,753 A * | 10/2000 | Keeble et al. ................ 714/25 |
| 6,154,273 A | 11/2000 | Suzuki ....................... 356/73.1 |
| 6,229,540 B1 | 5/2001 | Tonelli et al. ............... 345/356 |
| 6,233,074 B1 | 5/2001 | Lahat et al. ................. 359/118 |
| 6,344,910 B1 | 2/2002 | Cao ............................ 359/110 |
| 6,377,725 B1 | 4/2002 | Stevens et al. ............... 385/24 |
| 6,456,306 B1 | 9/2002 | Chin et al. .................. 345/810 |
| 6,470,385 B1 * | 10/2002 | Nakashima et al. ........ 709/224 |
| 6,529,473 B1 * | 3/2003 | Grenot et al. ............... 370/217 |
| 6,583,901 B1 | 6/2003 | Hung ......................... 359/124 |
| 6,584,535 B1 * | 6/2003 | Ouellet et al. .............. 710/305 |
| 6,678,475 B1 | 1/2004 | Turban et al. ................ 398/79 |
| 2001/0012141 A1 | 8/2001 | Takai et al. ................. 359/110 |
| 2002/0069275 A1 | 6/2002 | Tindal ......................... 709/223 |

* cited by examiner

Primary Examiner—Nabil El-Hady

(57) ABSTRACT

A method for automatically performing a network audit. The network may comprise a number of different types of devices, each with multiple possible configurations. In one embodiment, each device in a network is queried for its configuration. For example, a number of optical routers are queried as to what interface cards each has. All of the data may be collected from a single point in the network. Based on the responses, one or more status queries are issued to each device. Next, the process analyzes the responses according to a set of rules that are tailored for each possible device configuration. Then, one or more network audit tables are displayed. The tables have a similar look and feel regardless of the type of device or the device's configuration. For example, for each type of device configuration there may be tables pertaining to fault analysis, capacity and planning, configuration, and performance.

33 Claims, 15 Drawing Sheets

Fig. 2A

| Node Name | Overall Rank | Performance | | Fault | | Capacity Planning | | Configuration | | Total NREPs | Traffic Weighted Rank |
|---|---|---|---|---|---|---|---|---|---|---|---|
| | | NREPs | Rank | NREPs | Rank | NREPs | Rank | NREPs | Rank | | |
| | | | | | | | | | | | |
| | | | | | | | | | | | |
| | | | | | | | | | | | |

| Performance Management | |
|---|---|
| System | |
| Media | |
| Protocol | |
| Total NREPs | |

| Fault Management | |
|---|---|
| System | |
| Media | |
| Protocol | |
| Total NREPs | |

| Configuration Management | |
|---|---|
| System | |
| Media | |
| Protocol | |
| Total NREPs | |

| Capacity Planning Management | |
|---|---|
| System | |
| Media | |
| Protocol | |
| Total NREPs | |

400

| Command | Function |
|---|---|
| show srp | This command displays the MAC Addresses, Side A and Side B Node Address, IPS State, Node IPS State, IPS Self Detected Requests, IPS Remote Requests, IPS Messages Received, IPS messages transmitted, Topology Map and Nodes on the Ring |
| show controller srp | This command displays the Side A Active Defects, Side A Active Alarms, Side A Framing, Side A Clock Source, Side B Active Defects, Side B Active Alarms, Side B Framing and Side B Clock Source |
| show interface srp | This command displays the Status, Line Protocol, Encapsulation, Input Drops, Output Drops, Input Errors, Output Errors, No Buffer, Broadcasts, Total Resets, Load Percentage and Rely Percentage |
| show interface pos | This command displays the Status, Line Protocol, Encapsulation, Input Drops, Output Drops, Input Errors, Output Errors, No Buffer, Broadcasts, Total Resets, Load Percentage and Rely Percentage |
| show controller pos | This command displays the Active Defects, Active Alarms, Framing, Remote APS Status, Reflected Local APS Status, Remote Hostname, Remote Interface and Remote IP Address |
| show controller regen | This command displays the status, Error Count, Active Defects and Active Alarms |
| show gsr | This command displays the Slot Number, Card Type, Port Speed and State |
| show diag | This command displays the Node Name, Slot Number, Card Type, PCA Hardware Version, PCA Serial Number, MBUS Hardware Version, MBUS Serial Number, MBUS Software Version, ROM Monitor Version, Fabric Download Version, DRAM Size, Frfab SDRAM, Tofab SDRAM, Board State and Crashes. |

| Node Name | Card Type | Slot Number | Port Speed | State |
|---|---|---|---|---|
| | 4 Port Packet over Sonet | 1 | OC-3c/STM-1 | Line Card Enabled |
| | 1 Port POS | 2 | OC-12c/STM | Line Card Enabled |
| | | | | Critical |

| Node Name | Slot Number | Card Type | PCA HW Version | PCA Serial Number | MBUS HW Version | MBUS Serial Number | MBUS Agent SW Version | ROM Monitor Version | Fabric Downloader Version | DRAM Size in Bytes | FrFab SDRAM Size in Bytes | TOFab SDRAM Size in Bytes |
|---|---|---|---|---|---|---|---|---|---|---|---|---|
| GSR2 | Slot 0 | 4 Port POS | 1.1 | CAB020301 | 1.1 | CAB014400Q5 | 1.40 | 10.40 | 13.05 | 268435456 | 67108864 | 67108864 |
| | | | | | | | | | | | | |

| Board State | Crashes Since Restart |
|---|---|
| Enabled | 0 |
| Critical | Critical |

Fig. 5B

| Active Interface | Node IPS State | MAC Address Side A | MAC Address Side B | IPS State Side A | IPS State Side B | IPS Self Detected Requests Side A | IPS Self Detected Requests Side B | IPS Remote Requests Side A | IPS Remote Requests Side B |
|---|---|---|---|---|---|---|---|---|---|
| | Idle | 0000,bfbf,00 01 | 0000,bfbf,00 01 | Not Wrapped | Not Wrapped | Idle | Idle | Idle | Idle |
| Critical | Warning | Warning | Warning | Critical | Critical | Warning | Warning | Warning | Warning |

| Active Interface | Active Defects Side A | Active Defects Side B | Active Alarms Side A | Active Alarms Side B |
|---|---|---|---|---|
| | 0 | 0 | 0 | 0 |
| | Critical | Critical | Critical | Critical |

| Active Interface | Active Defects | Active Alarm | Remote APS Status | Reflected APS Status |
|---|---|---|---|---|
| POS 0/0 | none | none | none | none |
| | Critical | Critical | Warning | Warning |

| Active Interface | State | Error Count | Active Defects | Active Alarms |
|---|---|---|---|---|
| | Up | None | None | None |
| | Critical | Warning | Critical | Critical |

| Active Interface | In Q Drops | Out Q Drops | In Errors | Out Errors | No Buffer | Broadcasts | Total Resets |
|---|---|---|---|---|---|---|---|
| | 0.00 | 0.00 | 0.07 | 0.00 | 1 | 0 | 13 |
| | Critical | Critical | Warning | Warning | Warning | | Critical |

| Net Rule | Heading | Description |
|---|---|---|
| | Active Interface | Active Interface |
| If the value ≠IDLE | Node IPS State | Display the current IPS state of the node. Should be IDLE. Possible fault states are WRAPPED and PASSTHRU. Value ≠ IDLE are bolded red |
| No Mac Addresses for Side A or Side B | MAC Address Side A and B | IPS - intelligent protection system identifies the status of an SRP interface on the DPT ring. Side A is the Outer Ring RX neighbor Side B is the Inner Ring RX neighbor<br>Side A and Side B with no Mac addresses present are highlighted yellow |
| If Side A or Side B wrapped | IPS State Side A and Side B | Indicates a wrap condition exists on Side A or Side B of the DPT ring Wrapped on Side A and Side B will be bolded red |
| Value ≠ IDLE | IPS Self Detected Requests Side A and Side B | Locally generated requests other than IDLE could be LOCKOUT (LO), FORCED SWITCH (FS), SIGNAL FAIL (SF), SIGNAL DEGRADE (SD), and MANUAL SWITCH (MS). WAIT TO RESTORE (WTR). Values ≠ IDLE are highlighted yellow |
| Value ≠ IDLE | IPS Remote Requests Side A and B | Remotely generated requests other than IDLE could be LOCKOUT (LO), FORCED SWITCH (FS), SIGNAL FAIL (SF), SIGNAL DEGRADE (SD), and MANUAL SWITCH (MS). WAIT TO RESTORE (WTR). Values ≠ IDLE are highlighted yellow |
| If the value ≠ None | Active Defects Side A | Side A: Displays defects associated with the Side A ring value ≠ None will be bolded red |

700

Ⓐ CONTINUED ON SHEET 9/15

Fig. 7

| | | |
|---|---|---|
| If the value ≠ None | Active Defects Side B | Side B: Display defects associated with the Side B ring value ≠ None will be bolded red |
| If the value ≠ None | Active Alarms Side A | Side A: Displays the alarm status associated with the Side A ring value ≠ None will be bolded red |
| If the value ≠ None | Active Alarms Side B | Side B: Displays the alarm status associated with the Side B ring value ≠ None will be bolded red |
| If the value ≠ None | Active Defects | Indicates which types of errors have active defects Value ≠ None will be bolded red |
| If the value ≠ None | Active Alarms | Indicates which types of alarms are active value ≠ None will be bolded red |
| Field ≠ None | Remote APS Status | Displays remote APS system status. If this field ≠ none are highlighted yellow |
| Field ≠ None | Reflected Local APS Status | Displays remote APS system status. If this field ≠ none are highlighted yellow |
| If the value ≠ UP | State | Displays the operational state of the line card value ≠ UP will be bolded red |
| Field > 0 | Error Count | Indicates the total error count on the regenerator line card If value is greater than zero for any field highlighted yellow |

Fig. 7 (Continued)

| | | |
|---|---|---|
| | In Q Drops | Drops % for Input packets shows the percentage of frames dropped on input, relative to the total number of frames received on that interface. It is suggested that this ratio be below 1/2 of 1% of all input frames |
| It is suggested that this ratio be below 1/2 of 1% of all input frames. Values greater than this range are bolded red | Out Q Drops | Drops % for Output packets refers to the percentage of frames dropped on output, relative to the total number of frames transmitted on that interface. It is suggested that this ratio be below 1/2 of 1% of all input frames |
| It is suggested that this ratio be below 1/2 of 1% of all input frames. Values greater than this range are bolded red | Input Errors | Total Error % for Input packets lists the total number of input errors as a ratio to total packets received on this interface. A common example of an input error is a CRC.<br>Input errors >= 1% are highlighted yellow |
| Input errors >= 1% | Out Errors | Total Error % for Output packets lists the total number of output errors as a ratio to total packets transmitted on this interface. Output errors in many cases are indicative of hardware failures.<br>Out errors = 1% are highlighted yellow |
| Output errors >= 1% | No Buff | No Buff refers to the total number of no buffer conditions on this interface<br>Values > 0 are highlighted yellow |
| Values > 0 | Broadcast | The Bcast % column shows the percentage of broadcast frames to total frames input for this interface Total Bcast % refers to the percentage of broadcast frames to total frames |

Fig. 7 (Continued)

| | | |
|---|---|---|
| Values > 0 | Total Resets | Total Resets refers to the total number of interface resets on this router between iterations one and two<br>Values > 0 are highlighted yellow |
| Interfaces with a Load Percentage >= 50% | Load % | Load percentage indicates the value of the activity on a particular interface<br>Any interface with a Load Percentage >= 50% in highlighted yellow |
| Interfaces < 99.9% reliability | Rely % | Rely percentage indicates the availability of a particular interface<br>Any inteface < 99.9% reliability is highlighted yellow |

Fig. 7 (Continued)

SRP Configuration Table 800

| Active Interface | Nodes On The Ring | Framing | | Clock Source | |
|---|---|---|---|---|---|
| | | Side A | Side B | Side A | Side B |
| | | | | | |
| | 3 | SONET | SONET | Internal | Internal |
| | | | | | |

Fig. 8A

POS Configuration Table 850

| Active Interface | Framing | Remote hostname | Remote Interface | Remote IP Address |
|---|---|---|---|---|
| | | | | |
| | SONET | 7576 - 1A | POS4 / 0 / 0 | 10.128.2.1 |
| | | | | |

Fig. 8B

Capacity Planning Table 900

| Node Name | Optical Card Capacity | | | |
|---|---|---|---|---|
| | Card Type | Total Ports | Ports In Use | Ports Available |
| | | | | |
| GSR2 | 4 Port POS | 4 | 1 | 3 |
| | | | | |

Fig. 9

Performance Analysis Table 1000

| Active Interface | Load | Rely % |
|---|---|---|
| | | |
| | 55% | 98% |
| | Warning | Warning |

Fig. 10

| Node | Field Name | Frequency | Appendix Reference | Net Advice | Engineer / Author Comments |
|---|---|---|---|---|---|
| | | | | | |
| | | | | | |
| | | | | | |
| | | | | | |
| | | | | | |
| | | | | | |
| | | | | | |
| | | | | | |

NETWORK AUDIT TOOL

RELATED APPLICATIONS

This application is related to co-pending, commonly-owned U.S. patent application Ser. No. 09/828,022, filed Apr. 6, 2001, entitled "Optical Transport Concentrator Audit System and Method to DePaolantonio; and to co-pending, commonly-owned U.S. patent application Ser. No. 09/863,233, filed May 21, 2001, entitled "Carrier Class DWDM Optical Network Audit Tool" to DePaolantonio.

FIELD OF THE INVENTION

The present invention relates to the field of networks. Specifically, the present invention relates to a method for performing a network audit and presenting a report with a similar look and feel for all devices in the network.

BACKGROUND ART

Internetworking provides electronic devices the ability to communicate with remote devices, along with the associated benefits of such communication. However, networks can consist of large numbers of devices spread over enormous geographic areas. Consequently, maintaining the health of such networks present considerable challenges. Such networks may consist of a variety of types of devices, communicating over a variety of mediums, using various protocols. Such networks may include wireless devices, traditional voice, ATM, Frame Relay, Cable, DSL, and dial platforms. Optical networks are becoming increasingly popular for performance reasons.

Optical internetworking combines high performance data and optical networking technologies to create new optical networking solutions that can efficiently support the exponential growth of data traffic. This tremendous growth in traffic rates combined with the demands for new services are rapidly driving the implementation of optical networks. It is desirable to facilitate keeping network availability and performance at satisfactory levels.

Optical networks comprise a wide variety of optical devices, such as Dense Wave Division Multiplexers (DWDM), optical concentrators, optical routers, etc. Optical routers anchor the core of the optical internetworking infrastructure by accepting data traffic from traditional voice, ATM, Frame Relay, Cable, DSL, and dial platforms and then transmitting this data at high speeds across an optical networking infrastructure. Several protocols exists for transporting data. Sonet/SDH based network elements provide a reliable transport mechanism, performance monitoring, and ring based protection. Emerging technologies such as Dynamic Packet Transport (DPT), which is based on the Spatial Reuse Protocol (SRP), enable more efficient IP oriented approaches to building self-healing fiber rings for data transport.

Challenges exist in keeping network availability and reliability high in such complex networks whether or not they are optical. Some conventional techniques to report on the status of such networks are poorly organized. Thus, it is difficult for the end user to analyze the data and problems may exists without the user's knowledge. For example, the software that is running may need an update given the current network configuration. Or, the performance of the network may be sub-optimal because of changes in traffic flow since the network was designed.

Therefore, it would be advantageous to provide a method for performing a network audit. What is still further needed is a method that efficiently collects the data from a multitude of devices which are geographically diverse. What is still further needed is a method that presents an organized display of the data such that a user may take appropriate action if the network has faults or needs updates of hardware or software.

SUMMARY OF THE INVENTION

The present invention provides a method for performing a network audit. The present invention collects network data remotely and intelligently analyzes the data. The present invention displays the data in an organized fashion such that appropriate action may be taken to increase network performance or update hardware or software. The present invention warns that a device is functioning below acceptable standards or is about to fail.

A method for automatically performing a network audit is disclosed. All of the data may be collected from a single point in the network. The network may comprise a number of different types of devices, each with multiple possible configurations. The audit may be specifically directed to one type of device in the network or a sub-network. In one embodiment, first each device in a network is queried for its configuration. For example, a number of optical routers are queried as to what interface cards each has. Based on the responses, one or more status queries are issued to each device. Next, the process analyzes the responses according to a set of rules that are tailored for each possible device configuration. Then, one or more network audit tables are displayed. The tables have a similar look and feel regardless of the type of device or the device's configuration. For example, for each type of device configuration there may be tables pertaining to fault analysis, capacity and planning, configuration, and performance.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 2A is a table of node correlation information, according to an embodiment of the present invention.

FIG. 2B are tables of network audit exception details, according to an embodiment of the present invention.

FIG. 4 is a table summarizing exemplary commands that are used to query the optical router devices for specific information, according to embodiments of the present invention.

FIG. 5A is a table summarizing optical hardware for all nodes in the network, according to an embodiment of the present invention.

FIG. 5B a table providing information on optical cards in the network, according to an embodiment of the present invention.

FIG. 6A a table of Spatial Reuse Protocol (SRP) statistic fault management, according to an embodiment of the present invention.

FIG. 6B a table of SRP defects and alarms fault management, according to an embodiment of the present invention.

FIG. 6C a table of packet over SONET defects and alarms fault management, according to an embodiment of the present invention.

FIG. 6D a fault management table for optical regenerators, according to an embodiment of the present invention.

FIG. 6E a fault management table for optical router interfaces, according to an embodiment of the present invention.

FIG. 7 is a summary of net rules and associated warning and critical condition which they trigger, according to embodiments of the present invention.

FIG. 8A a table of SRP configuration information, according to an embodiment of the present invention.

FIG. 8B a table of packet over SONET configuration information, according to an embodiment of the present invention.

FIG. 9 a table for capacity planning, according to an embodiment of the present invention.

FIG. 10 a table for performance analysis, according to an embodiment of the present invention.

FIG. 11 a table of network audit task list information, according to an embodiment of the present invention.

DETAILED DESCRIPTION OF THE INVENTION

In the following detailed description of the present invention, a method for performing a network audit, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Network Audit Tool

Figure 1:
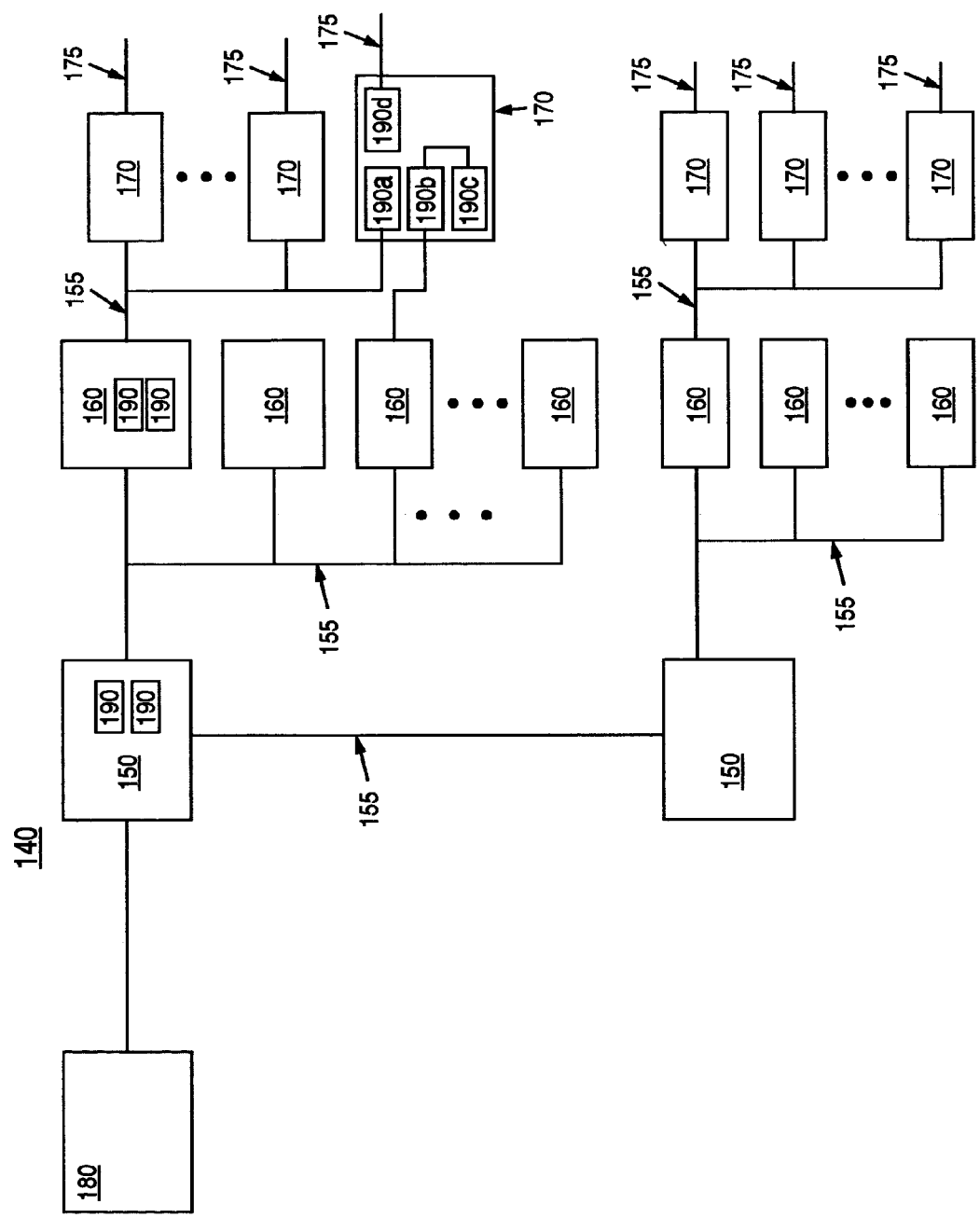
FIG. 1 is a diagram of a optical network, which embodiments of the present invention audit.

Embodiments, of the present invention may be practiced in a network, such as the exemplary optical network 140 of FIG. 1. FIG. 1 shows Dense Wave Division Multiplexing 150 (DWDM) optical routers, which may be, for example, located in New York and Los Angeles respectively. Connecting the DWDMs 150 is an optical communication link 155 suitable for an extremely high throughput. Multiple optical concentrators 160 take the signals from each DWDM and provide them for optical routers 170. The optical routers 170 may have one or more optical interfaces on the concentrator 160 side and one or more interfaces on the non-optical communication link 175 side. For example, the non-optical link 175 may be, traditional voice, ATM, Frame Relay, Cable, DSL, or a dial platforms. A network audit tool 180 is able to connect to the network 140 at any convenient location. From a single location, the network audit tool 180 is able to collect data by querying the various devices. While an example of an optical network 140 is shown, the present invention is well-suited to other networks, such as wireless, cable, DSL, etc.

Still referring to FIG. 1, each device may have multiple nodes 190, which may correspond to the cards the device has. For example, an optical router 170 may have several nodes 190 corresponding to cards which support a DPT interface 190a and several more nodes 190 corresponding to cards which support a POS interface 190b. Additionally, the optical router 170 may have one or more nodes 190 which correspond to a card for an optical regenerator 190c. There may be non-optical nodes 190d, such as the one interfacing to the non-optical communication link 175. The optical concentrators 160 and the DWDMs 150 also may each have one or more nodes 190, depending upon how each device is configured.

Embodiments of the present invention collect data regarding network performance, defects, errors, configuration, etc., and automatically analyze the data. Then, the data is organized in a user-friendly fashion and displayed as a number of tables. By organizing the network information, an end-user is able to obtain an understanding of the general health of the optical network 140. This information may be used to make recommendations for the network 140 on issues such as, software versions, hardware upgrade platforms, and configuration/topology changes. Embodiments are able to identify configuration mismatches in the network 140 and make recommendations of standard processes that can be implemented to manage the resource. Additionally, the audit may identify areas in which overall network 140 availability can be maximized. Embodiments display information related to four categories: configuration, faults, capacity, and performance.

An embodiment of the present invention uses Net Rules and Net Rules Exception Points (NREPs) to define levels of criticality within the network 140. Net Rules provide an objective method to gauge the readiness and stability of a node 190 by using pre-determined thresholds. Two thresholds may be defined. First, a 'warning', which may be indicative of possible problematic areas and should be investigated. Warnings appear within data tables, highlighted yellow with bolded font, in the preferred embodiment. Warnings are assigned one point. A second threshold is 'critical', which may be defined as a condition that requires immediate action. Critical thresholds are preferably displayed as bolded red font. Critical thresholds are assigned 1000 points. Using these two thresholds, a Net Audit Health Percent may be defined according to Equation 1:

$$\text{Net Audit Health \%}=100-((\text{Total NREPs/Total Possible NREPs})\times 100) \quad \text{Equation 1}$$

An embodiment ranks the nodes 190 in the network 140 and displays them from poorest to best as seen in the node correlation table 200 of Figure 2A. The greatest improvements in the network 140 are achieved by correcting the worst nodes 190 first, for example, those with the overall highest number of actual NREPs. Node correlation table 200 lists the number of NREPs, as well as the rank for each of the four Network Impact Categories—Fault, Performance, Capacity Planning, and Configuration. Additionally, a summary of the values is listed. Thus, the table 200 provides considerable advice in determining where to focus cleanup efforts. Node health is computed by the traffic coefficient times total NREPs out of total possible NREPs, as shown in Equation 2.

$$(\text{Actual NREPs/Total NREPs})\times \text{Traffic Co-efficient} \quad \text{Equation 2}$$

The traffic coefficient is used to compensate for the amount of traffic at a given node 190. For example, a node 190 with high traffic would be expected to have more NREPs than a node 190 with low traffic; therefore, the more traffic a node 190 has, the lower its traffic coefficient is. The traffic co-efficient may or may not be presented in the network audit information, depending on the type of network being audited.

The four tables of FIG. 2B break down the ranking for each impact category by system, media, and protocol. The system area relates to issues such as, for example, hardware, software, and firmware. Media refers to issues related to the status of the media, for example, Ethernet, token ring, DWDM, etc. Protocol refers issues related to protocol, for example, TCP/IP, bridged, etc. Each table gives total exceptions for a given node 190, in this embodiment.

Figure 13:
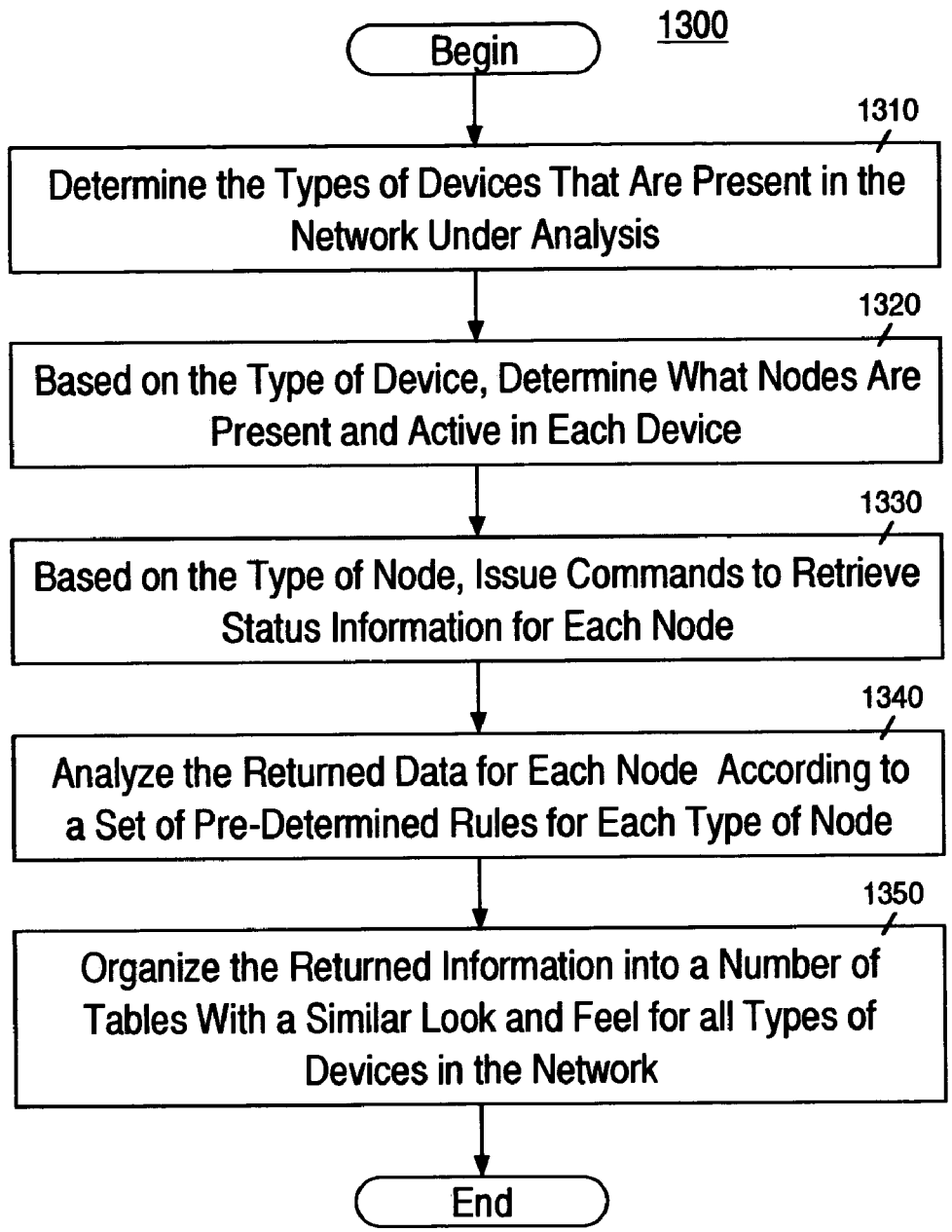
FIG. 13 is a flowchart illustrating the steps of a process of performing a network audit, according to an embodiment of the present invention.

FIG. 13 illustrates a process 1300 for performing a network audit when the network may comprise devices of many different types. In step 1310, a network audit tool 180 determines the types of devices which comprise the network. For example, there may be DWDMs 150, optical concentrators 160, optical routers 170, or non-optical devices. The network under audit may comprise devices of all one type or of many types. The present invention is not limited to optical networks.

In step 1320, the process 1300 determines what nodes 190 are present and active in each device. In this step, the network audit tool may issue a command to each device, based on the type of device. For example, if the device is an optical router 170, the network audit tool 180 will issue a different command than if the device is an optical concentrator 160, etc.

In step 1330, the process 1300 determines status information (e.g., error counts, defects, faults, alarms, performance and capacity information, etc.) for each node 190, based on the type of node 190. For example, if the node 190 is an optical regenerator, the process will issue one or more commands which are suitable for that type of node 190. Different commands may be suitable if the type of node 190 is a card for a POS interface or a DPT interface.

In step 1340, the process 1340 analyzes the data which is returned in response to the status queries. Each node 190 is analyzed according to a set of pre-determined rules which are tailored to that type of node 190 (e.g., interface card, etc.). The rules may be modified or new rules added to adapt to new cards or to account for different performance values, etc.

In step 1350, the network audit information is organized into a set of tables that have a similar look and feel for all types of devices in the network. This information is transferred to a user, who may easily gain an understanding of network health and which nodes 190 may need to be further examined for problems.

Figure 3:
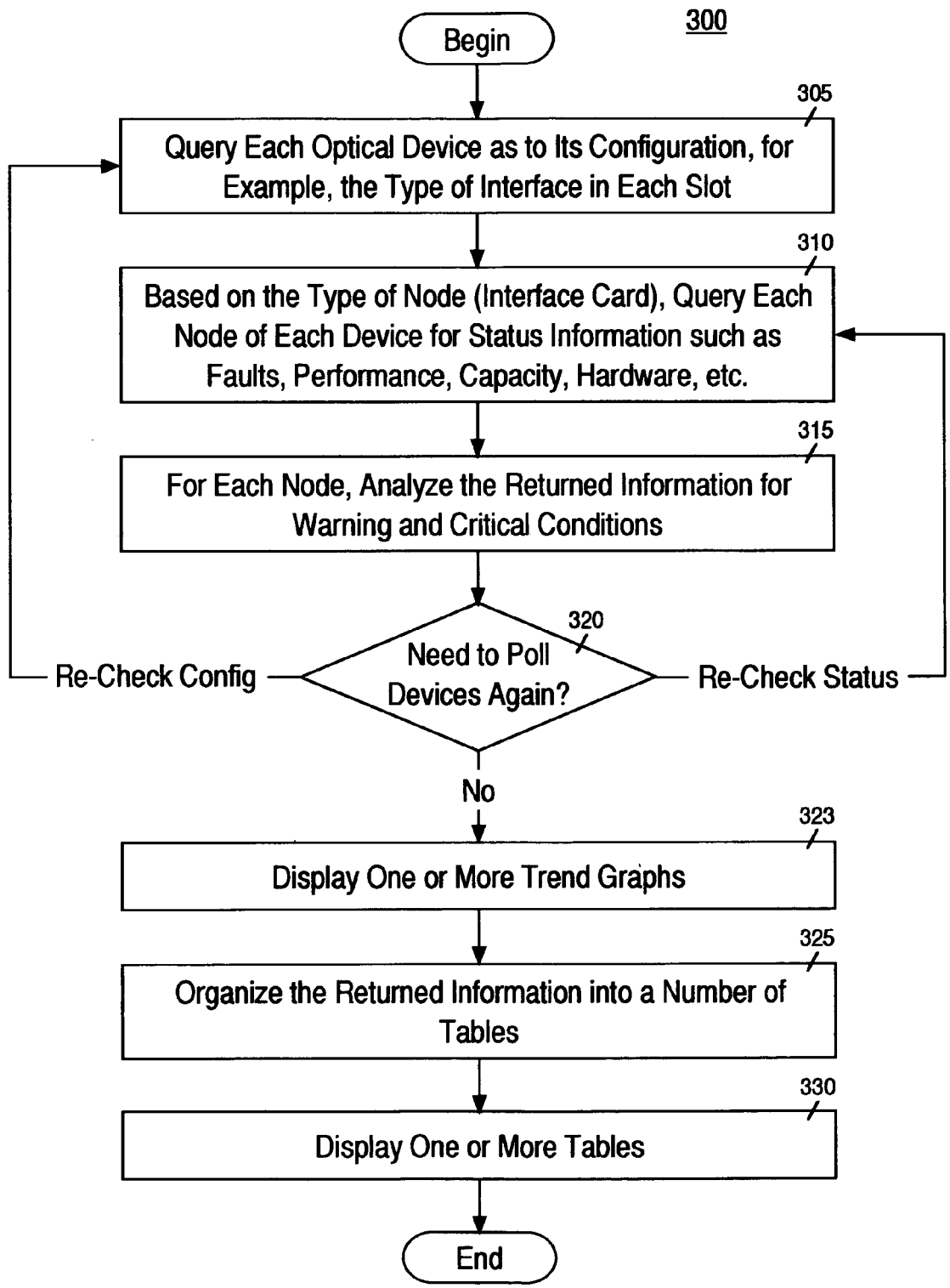
FIG. 3 is a flowchart illustrating a process of performing a network audit for a network of optical routers, according to embodiments of the present invention.

A process 300 of providing a network audit may be described, as seen in FIG. 3. In step 305, the process 300 queries the optical device as to its device configuration. For example, this information may be related to the types of cards which are in the chassis of an optical router 170. In this fashion, the nodes 190 and its type is determined for each device. In one embodiment, a command, or series of commands are issued to a device in the optical network 140 for it to return the type card in each slot. Information such as port speed and the card state may also be returned. In one embodiment, commands are issued with the aid of software provided by the manufacturer of the device being queried. For example, software provided by Cisco Systems, of San Jose, Calif. will query the device for configuration information. Referring to FIG. 4, commands such as show_gsr or show_diag may be issued to retrieve information such as the node name, slot number, card type, and hardware and software version. However, the present invention is not limited to using Cisco proprietary commands to retrieve the information. In other embodiments, other commands, such as, for example, commands provided by other vendors are used. The type of commands issued may depend on the manufacturer of the devices being audited. In still other embodiments, the information may be retrieved by any suitable means of communicating with the optical devices. The step may be performed for all devices in the network 140 or for all devices of a given type. For example, only optical routers 170 or only optical concentrators 160 are queried, in one embodiment.

In step 310, the process 300 queries the devices again, based on the response to the configuration query of step 305. As discussed herein, each device may comprise multiple nodes 190, which may correspond to a specific interface card, for example. Thus, status information for each node 190 of each device is collected. For example, if the device contains a card for a SONET interface, the process 300 will query the device for pertinent information regarding the state of that card and/or its associated network 140. Referring again to FIG. 4, a 'show interface pos' command queries the device for the active defects, active alarms, framing, remote APS status, reflected local APS status, remote hostname, remote interface and remote IP address of the packet over SONET network 140. A 'show controller POS' queries for the status, line protocol, encapsulation, input drops, output drops, input errors, output errors, no buffer, broadcasts, total resets, load percentage and rely percentage of the packet over SONET network 140. It will be understood that other suitable methods may be used to retrieve this information. Also, not all of the information listed in the table of FIG. 4 for each command may be needed. A device may respond that it has an interface card which is not of interest for this audit, in which case the interface card is ignored. A command which is issued in step 305 to retrieve configuration information may also collect information which may be considered status information. Throughout this application status information may refer to the type of information which is retrieved by the commands listed in the table of FIG. 4, or similar information. This may be any information necessary to perform the network audit. However, the type of cards in the device is not status information. It will be understood that the nature of the status information may be device dependent.

In step 315, the process 300 analyzes the returned data. In so doing, the process 300 may apply a set of net rules, such as those in FIG. 7. It will be understood that the net rules may be adapted for a particular device or card type. For example, if the device is a optical concentrator 160 the net rules will be adapted to handle the possible configurations, faults, performance issues, etc. of that device. Furthermore, the net rules may be adapted to handle new types of devices, cards, or changes to performance values, etc. In this step, the process 300 determines if a warning condition or a critical condition should be displayed.

As the status of the devices and their associated connections may change over time, the process 300 determines if the data needs to be updated, in step 320. For example, the configuration check of step 305 may be performed once a week or hourly. The status information, which may be determined by multiple queries, may be checked, for example, daily, hourly, or even every few minutes. The polling frequency may be adapted to each device in the network 140.

In optional step 323, one or more trend graphs are reported. The trend graphs show a trend over time of particular data points. For example, the number of active defects over a week interval may be displayed, with a suitable granularity.

In step 325, the process organizes the analyzed data into a number of tables. The tables may be categorized by system, fault, capacity planning, performance, etc. However, other categories may be presented. In this fashion, the present invention provides tables with a similar look and feel for all devices and nodes 190 regardless of their type.

Embodiments organize the network audit information into a number of tables. The following describes exemplary tables that may be used for a network audit of optical routers 170.

System Overview Tables

Embodiments of the present invention allow an analysis of the overall system. Referring to FIG. 5A, the optical hardware summary table 500 lists the node 190, slot number, card type (e.g., SONET, DPT, regenerator, etc.), port speed and state (e.g., line card enabled) of all optical interface cards in the network 140. The card type indicates how the device is configured. If the state of the line card is not equal to enabled, a critical condition is indicated, for example, by highlighting the table entry in red. Each table may contain multiple rows, which correspond to one node 190. The bottom row in the table indicates whether the information in that column is highlighted as a warning or critical condition.

Referring now to FIG. 5B, the optical card table 550 provides information on card hardware versions, serial numbers, DRAM and SDRAM sizes, board states and any board crashes. For example, the node name displays name of the node 190, in this example GSR2. The card type may be a four port packet over Sonet, etc. The slot number displays the slot in which the line card is installed. The Port Speed Displays the port speed of an associated line card.

The table also shows the PCA Hardware Version and Serial Number displays, the MBUS Hardware Version, serial number, and agent software version. Also displayed are the ROM monitor version, the fabric downloader version, the size of DRAM, the from fabric downloader SDRAM size in bytes, the to fabric downloader SDRAM size in bytes. If the board state of the line card is not enabled, it may be highlighted in red to indicate a critical condition. A critical condition is also indicated if the crashes since restart is not equal to zero. In this fashion, the embodiments of the present invention provide an well organized, easily readable table, which the user may quickly reference for key information. The present invention is well suited to summarizing information for any type of device in a network 140.

Fault Analysis Tables

Embodiments of the present invention provide tables showing fault analysis, as shown in FIG. 6A through FIG. 6E. FIG. 6A show an SRP Statistics fault management table 610, which provides ring status for each SRP controller. The active interface refers to the specific SRP card being analyzed. For rings A and B, the table lists the IPS self detected and remote requests, MAC addresses, and IPS state.

One possible states for node IPS state is 'idle', indicating the node 190 is ready to perform a protection switch and send idle IPS message to both of its adjacent neighboring nodes 190. Another possible state is 'wrapped', indicating the node 190 is providing a protection switch by wrapping traffic from the inner to the outer ring (or vice versa). If the node IPS state is not equal to idle, the value is highlighted in red to indicate a critical condition. Suitable advise to the user in this case is to verify that the fiber facility and node operational state to isolate the problem. If there are no MAC addresses present for either the A or B side, yellow is used in this box to indicate a warning condition. The absence of a MAC address could indicate a wrapped ring, problems with topology discovery packets, or a physical layer ring problem. Therefore, upon seeing this warning, the user may verify the ring, node 190, and topology integrity. The side A and side B ring correspond to the bi-directional dual counter ring topology used in SRP. These rings may also be known as the inner ring and the outer ring.

Still referring to FIG. 6A, if any IPS request is not idle, a warning condition is indicated, for example, by highlighting the table entry in yellow. Possible non-idle conditions may be automatic requests such as: a Signal Fail (SF), which is initiated by detecting a Loss of Signal (LOS), a Loss of Frame (LOF), a line Bit Error Rate (BER) above a specific threshold, a line AIS, or an excessive CRC error; a Signal Degrade (SD), which is initiated by detecting a line Bit Error Rate (BER) above a specific threshold or excessive CRC error: a Wait-to-Restore (WTR), which is used to prevent protection witching oscillations by waiting for a configured period of time before unwrapping. Manual IPS requests include Forced Switch (FS), which provides the network operator with a manual means of forcing a protection switch at the node 190 where the command was issued as well as the adjacent node 190. This command is useful during procedures to add a new node 190 on the ring. Another manual IPS request is Manual Switch (MS), which is similar to a forced switch but has lower priority.

FIG. 6B shows a table of SRP defects and alarms fault management 620. The SRP status table 620 provides information on the physical health of the DPT ring as seen by the active interface. A critical condition is indicted if active defects or active alarms on either ring are not equal to zero. An active defect may indicate that the ring is automatically recovering from a fiber facility or node 190 failure by wrapping traffic around the failure. In this case, nodes 190 adjacent to the failure wrap the ring to restore the ring from the failure. The intermediate nodes 190 then pass through data and IPS control packets to their intended destinations. An example of alarm status is an Alarm Indication Signal (AIS), which occurs as a result of a failure condition such as loss of frame (LOF) or loss of signal (LOS) and is used to notify downstream nodes 190 that a failure has occurred.

Embodiments may provide advise when an active defects occurs. For example, the user is advised to verify the ring, node 190, and topology integrity. Advice for an active alarm may be to check the fiber facility.

FIG. 6C shows a defects and alarms table for packet over SONET 630, which provides information on the physical health of the POS line card and the associated SONET ring, if applicable. If either the active defects or alarms are not equal to zero, a critical condition is indicated. If the remote and reflected local APS status are not equal to none, a warning condition is indicated. The remote and reflected local automatic protection system (APS) status each indicate a fast recovery from fiber or equipment failures in the network 140. For example, a network element that has detected a failed working line has switched the service to a spare (protection) line.

FIG. 6D shows an optical regenerator fault management table 640, which lists information relative to the health and operation of the optical regenerator line card for the node 190 listed in the active interface field. If the state is not equal to up, a critical condition is displayed. If the error count is not equal to zero, a warning condition is indicated. If the active defects or active flag field is 'populated' a critical condition is indicted, for example by using red boldface.

FIG. 6E shows an optical interface fault management table 650, which is applicable for all optical router 170 interfaces. The optical interface table 650 provides data on the overall throughput, performance and health of each optical interface line card (e.g., DPT 190a, POS 190b, optical regenerator 190c, etc.). Information provided here can be used to isolate network problems and/or performance tune the network 140. If the input Q drops has a ratio above 0.5 percent of all input valid frames, then a critical condition is indicated. If the output Q drops has a ratio above 0.5 percent of all output valid frames, then a critical condition is indicated. If the input or output errors are greater than or equal to 1 percent, a warning condition is indicated. The no buffer field is a count of the number of received packets discarded because there was no buffer space in the main system. Any number other than zero for the no buffer is indicated as a warning. The broadcast field shows the percentage of broadcast frames to the total frames for this interface. Values greater than zero are signaled as critical for the total reset field. For all of the fields in table 650, other values may be used to define warning and critical conditions.

An embodiment provides suitable advice for an input drop condition, such as to re-transmit if the traffic is data. For processed switched traffic, buffer tuning or reduced process-switched traffic may be suitable. Advice for output drops may be to avoid the drop for voice traffic, but to ignore the drop for most other cases.

As discussed herein, embodiments of the present invention use 'net rules' to analyze the data which is returned from the optical devices (e.g., DWDMs 150, optical concentrators 160, optical routers 170, etc.). These rules are used to define the critical and warning conditions. FIG. 7 shows a table 700 summarizing the various net rules that are used in the analysis of optical routers 170. FIG. 7 is not generally displayed to the end user. Rather it summarizes how information is displayed in the other tables. However, a table which summarizes all warning and critical conditions, or a selected subset, may be displayed to the user. The first column is the net rule, which defines a warning or critical condition. The second column lists the active interface. The last column lists a description of what is displayed for the particular field, as well as whether the condition is a warning (e.g., yellow) or critical (e.g., red). For example, the node IPS state displays the current state of the node 190, which should be idle. Possible fault states are 'wrapped' and 'passthru'. Values other than idle may be highlighted red to indicate a critical condition.

Configuration Tables

Embodiments also provide configuration management tables, as seen in FIG. 8A and FIG. 8B. The SRP configuration table 800 provides information on framing and clock information to assist with configuration management. In this example, the number of nodes 190 on the ring is equal to three, the framing type which is configured is SONET, and an internal clock source which is configured. Values are provided for each active interface.

FIG. 8B shows a packet over SONET (POS) configuration table 850, which provides information on framing and remote node information to assist with configuration management. In this example, the framing is SONET, and a remote hostname, interface, and IP address are provided. Tables may also be displayed for however optical devices are in the network 140 are configured. The present invention is well suited to displaying other configuration management tables, for example, if other protocols are supported by the optical devices.

Capacity Table

Embodiments also provide for capacity planning, as shown in FIG. 9. The capacity planning table 900 lists a compilation of the optical interfaces contained in the optical router 170, the port speed, number of total ports available on the card, ports in use, and ports available for use. Thus, this table assists in determining the available growth of the optical router 170.

Performance Table

Referring now to FIG. 10, embodiments also provide performance information. The performance analysis table 1000 provides the load and reliability percentages for an associated optical interface module. The load percentage indicates the value of the activity on a particular interface. A warning condition is indicated if the percentage is greater than 50%. The rely percentage indicates the availability of a particular interface. A warning condition is indicated if the rely percent is below 99.9%. Each identifies a potential performance issue or mis-configuration.

Net Advice Table

The present invention is also able to provide advice, based upon an analysis of the data collected, as discussed herein. The net audit task list of FIG. 11 provides network specific information system by system that will provide recommendations or advise. The net audit task list table 1100 lists the audited nodes 190 with the 'worst' ranking on top. Ranks are based on the points assigned to each exception. For example, warning conditions may be assigned 1 point and critical conditions 1000 points. The table 1100 provides reference information about systems that may be improved, as well as specific comments and recommendations to make the improvement.

Embodiments provide the ability to automatically move from one table to another. For example, from most tables the user may click on a field in a table to display the node correlation table 200 or the net audit task list table 1100. In one embodiment, detailed information regarding a node 190 or network, which is stored on a computer readable medium (e.g., Compact disk, hard drive, etc.), may be accessed and displayed to the user in response to a request for additional information about that node 190 or network.

Figure 12:
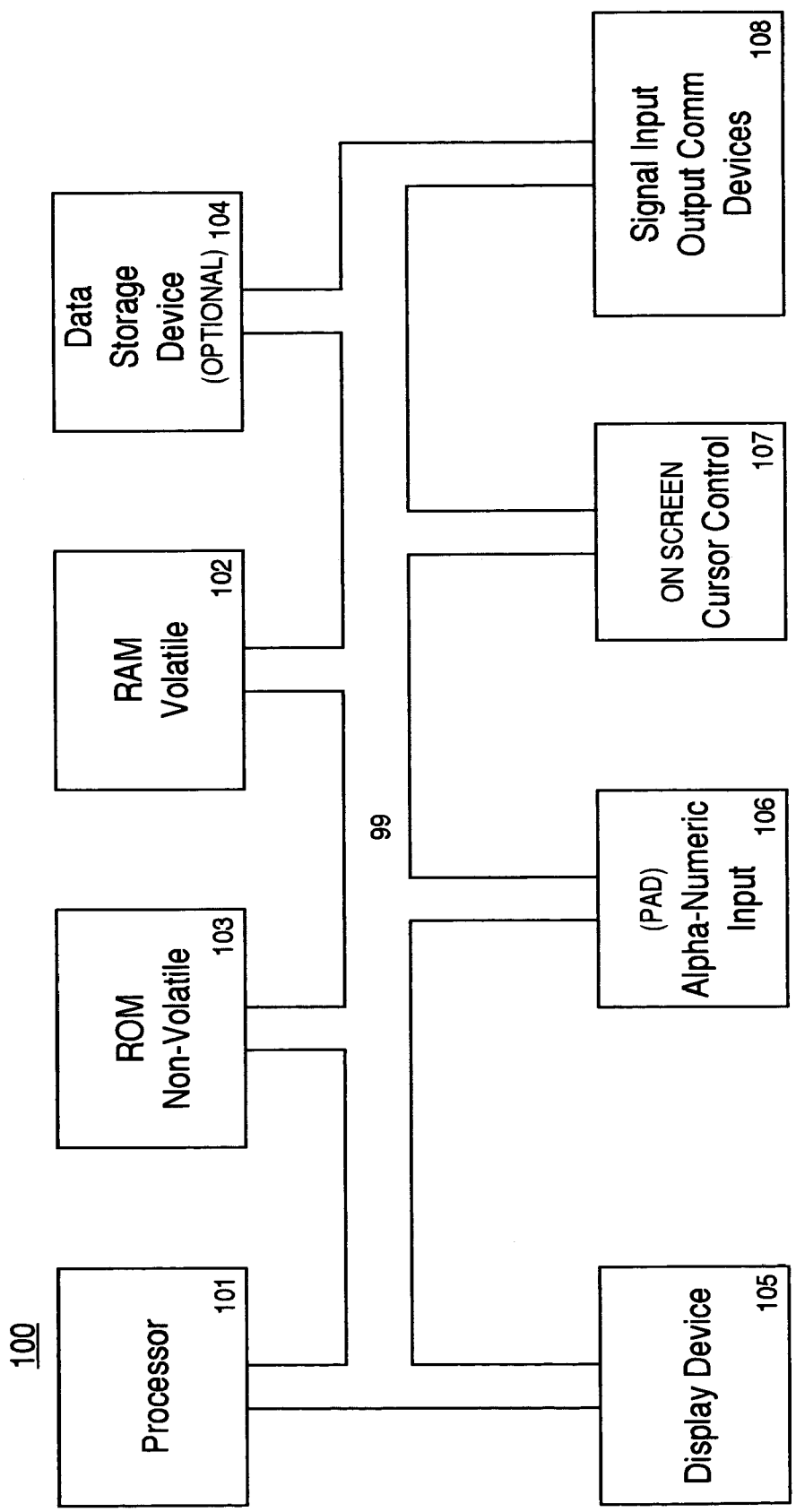
FIG. 12 is a schematic of a computer system, which may form a platform upon which to practice embodiments of the present invention.

FIG. 12 illustrates circuitry of host computer system 100, which may form a platform upon which to perform an embodiment of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Also included in computer system 100 of FIG. 12 is an optional alphanumeric input device 106. Device 106 can communicate information and command selections to the central processor 101. System 100 also includes an optional cursor control or directing device 107 coupled to the bus 99 for communicating user input information and command selections to the central processor 101. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Signal communication device 108, also coupled to bus 99, can be a serial port.

The preferred embodiment of the present invention, a method for performing a network audit, is thus described. While the present invention has been described in particular embodiments, it should be appreciated that the present invention should not be construed as limited by such embodiments, but rather construed according to the below claims.

I claim:

1. A method of performing an audit of a network, said method comprising the steps of:
    a) querying a plurality of devices in said network for device configuration information, wherein said plurality of devices comprise at least one node which is specified by said configuration information;
    b) based on a response from said plurality of devices to said queries of said step a), issuing a plurality of queries to retrieve status information from a plurality of nodes in said network;
    c) analyzing the responses to said status queries according to sets of rules to create network audit information, wherein said analyzing comprises determining a ranking of nodes of the plurality of devices, and wherein said ranking comprises separate rankings for a plurality of categories including at least two of: faults, performance, capacity planning, and topology; and
    d) reporting said network audit information including said ranking of nodes for said at least two categories.

2. The method of claim 1 wherein said step c) comprises the step of:
    c1) including advice based on said analysis in said network audit information.

3. The method of claim 1 wherein said step d) comprises the step of:
    d1) transferring said network audit information to a user.

4. The method of claim 3 wherein said network audit information is presented in a table selected the group consisting of:
    hardware summary, fault management, performance analysis, configuration management, and capacity planning.

5. The method of claim 1 wherein said step b) comprises the step of:
    b1) repeating a query to retrieve status information from a first node of a first device of said plurality of devices at a pre-determined interval.

6. The method of claim 1 wherein:
    said step c) comprises the step of determining that a condition exists at a first node of a first device of said plurality of devices that requires corrective action; and
    said step d) comprises the step of reporting said condition.

7. The method of claim 1 wherein:
    said step c) comprises the step of determining that a possible problem exists at a first node of a first device of said plurality of devices; and
    said step d) comprises the step of reporting said possible problem.

8. The method of claim 1 further comprising the steps of:
    e) ranking said nodes of the plurality of devices by severity of defects; and
    f) including said ranking in said network audit information.

9. The method of claim 1 further comprising the steps of:
    e) storing network audit information for a first node of a first device of said plurality of devices on a computer readable medium; and
    f) automatically accessing and transferring said network audit information for said first node in response to a request for additional information regarding said first node.

10. The method of claim 1 further comprising the step of:
    e) determining the types of devices in said network, wherein said network comprises a plurality of types of devices.

11. The method of claim 10 wherein said step a) comprises the step of:
    a1) basing a query to a device on said device type.

12. The method of claim 1, wherein said determining the ranking of nodes comprises calculating exception points that define levels of criticality.

13. The method of claim 12, wherein said levels of criticality comprise thresholds assigned respective point values, wherein said ranking is based on said point values.

14. The method of claim 13, wherein said ranking is further based on traffic.

15. The method of claim 1, wherein said ranking comprises a combined ranking that combines a plurality of said categories.

16. The method of claim 1, wherein said ranking comprises a combined ranking that combines at least three of said plurality of said categories.

17. The method of claim 1, wherein said ranking comprises a combined ranking that combines faults, performance, capacity planning, and topology.

18. The method of claim 1, wherein said d) comprises providing a report having separate quantitative assessments for system, media, and protocol.

19. A method of performing an audit of network comprising a plurality of optical routing devices, said method comprising the steps of:
   a) determining the nodes that each of said plurality optical routing devices comprises and determining for each said node its type, wherein said optical routing devices are operable to provide an interface between data transferred on an optical communication link and a communication link which is not optical;
   b) based on said node type, issuing a command to retrieve the status of each said node of each of said plurality of optical routing devices;
   c) analyzing the responses to said status queries according to rules tailored for said node type to create network audit information comprising a quantitative assessment for each node for at least two categories comprising faults, performance, capacity planning, and network configuration, wherein said quantitative assessment allows determining a ranking of said nodes for either individual ones of said categories or a plurality of said categories; and
   d) reporting said network audit information.

20. The method of claim 19 wherein said step c) comprises the step of:
   c1) determining if a critical condition exists in said network by applying pre-determined rules to said status queries, wherein said rules are based on the node type.

21. The method of claim 19 wherein said step d) comprises the step of:
   d1) providing advice based on said analysis, wherein corrective action to said network is assisted.

22. The method of claim 19 wherein said step b) comprises the step of:
   b1) repeating a query to at least one node of a first optical routing device of said plurality of optical routing devices at a predetermined interval.

23. The method of claim 19 wherein said node types are selected from the group consisting of: Dynamic Packet Transport (DPT), Packet Over Synchronous Optical Network (POS), and Optical Regenerators.

24. The method of claim 19 wherein said step b) comprises the step of:
   b1) issuing a command to retrieve status information from a node operable provide an interface for a Dynamic Packet Transport (DPT) network.

25. The method of claim 19 wherein said step b) comprises the step of:
   b1) issuing a command to retrieve status information from a node operable provide an interface for a Packet Over Synchronous Optical Network (POS).

26. The method of claim 19 wherein said step b) comprises the step of:
   b1) issuing a command to retrieve status information from a node operable to function as an optical regenerator.

27. A computer readable medium having stored thereon program instructions for implementing a method for performing an audit of an optical network, said method comprising the steps of:
   a) from a single point in said optical network, querying a plurality optical routing devices to determine active nodes in each of said plurality of optical routing devices;
   b) based on responses from each of said plurality optical routing devices, issuing a query to retrieve status information from said active nodes in each of said plurality of optical routing devices;
   c) analyzing responses to said status queries to create network audit information, wherein said analyzing comprises
      determining, for ones of said active nodes, individual rankings for at least two of a plurality of categories comprising: faults, performance, capacity planning, and network configuration; and
   determining a combined ranking of said ones of said active nodes for said at least two in a plurality of categories; and
   d) reporting said network audit information including said individual rankings and said combined ranking of said active nodes.

28. The computer readable medium of claim 27, wherein said method further comprises the step of:
   e) ranking said active nodes by severity of defects.

29. The computer readable medium of claim 27 wherein said method further comprises the steps of:
   e) reporting that a critical condition exists at a first active node; and
   f) reporting that a warning condition exists at a second active node.

30. The computer readable medium of claim 27 wherein said method further comprises the steps of:
   e) reporting a trend of network data over time.

31. Means for automatically performing an audit of an optical network, comprising:
   means for determining the device type for a plurality of optical devices in said optical network;
   means, based upon said device type, for querying said plurality of optical devices to determine the nodes said plurality of optical devices comprise and for each said node its type;
   means for determining an appropriate query for status information for a plurality of types of node in said optical network;
   means for querying said nodes of said plurality of optical devices for said status information;
   means for analyzing responses from said status inquiries according to sets of rules that are tailored for respective device types and respective node types, wherein said analyzing comprises determining a ranking of nodes of the plurality of optical devices, wherein said ranking comprises separate rankings for a plurality of categories including at least two of: faults, performance, capacity planning, and topology; and
   means for organizing a display of network audit information, including said ranking of nodes of the plurality of optical devices, wherein said network audit information is displayable with a common organization regardless of the type of device under analysis.

32. The means of claim 31 further comprising:
means for rating the relative health of said optical network; and
means for ranking the relative health of a plurality of said nodes in said optical network.

33. The means of claim 31 further comprising:
means for providing advice based on said analysis of said optical network.

* * * * *